United States Patent [19]

Fraser et al.

[11] Patent Number: 5,092,942

[45] Date of Patent: * Mar. 3, 1992

[54] METHOD OF REPAIRING OR MODIFYING TURBINE BLADES

[75] Inventors: Michael J. Fraser, Worcestershire, United Kingdom; Jesse C. Hendelman, Waterford; Robert F. Hayes, Meriden, both of Conn.

[73] Assignee: Refurbished Turbine Components Limited, United Kingdom

[ * ] Notice: The portion of the term of this patent subsequent to Sep. 19, 2006 has been disclaimed.

[21] Appl. No.: 496,986

[22] Filed: Mar. 21, 1990

[30] Foreign Application Priority Data

Mar. 28, 1989 [GB] United Kingdom ................. 8906929
Jul. 21, 1989 [GB] United Kingdom ................. 8916784

[51] Int. Cl.$^5$ .............................................. C21D 8/00
[52] U.S. Cl. ............................ 148/12 R; 148/11.5 Q; 29/402.18; 29/402.21
[58] Field of Search ................. 148/12 R, 11.5 Q; 29/402.10, 402.21, 156.8 B

[56] References Cited

U.S. PATENT DOCUMENTS

| 1,751,570 | 3/1930 | Allen . | |
|---|---|---|---|
| 2,632,944 | 3/1953 | Kittelson | 29/359 |
| 3,449,816 | 6/1969 | Swick et al. | 29/402 |
| 3,528,200 | 9/1970 | Allen et al. | 51/143 |
| 3,564,689 | 2/1971 | Hirtenlechner | 29/156.8 |
| 3,660,882 | 5/1972 | Widowitz et al. | 29/156.8 |
| 4,028,787 | 6/1977 | Cretella et al. | 29/156.8 |
| 4,866,828 | 9/1989 | Fraser | 29/402.18 |
| 4,896,408 | 1/1990 | Fraser | 29/402.13 |
| 4,953,776 | 9/1990 | Fraser | 29/402.13 |

FOREIGN PATENT DOCUMENTS

| 2054549 | 5/1972 | Fed. Rep. of Germany . |
| 309235 | 4/1929 | United Kingdom . |
| 1223730 | 5/1971 | United Kingdom . |
| 2091139 | 7/1982 | United Kingdom . |
| 2091140 | 7/1982 | United Kingdom . |
| 2124126 | 2/1984 | United Kingdom . |
| 2198667 | 6/1988 | United Kingdom . |
| 2208483 | 5/1989 | United Kingdom . |

OTHER PUBLICATIONS

Oates, J. A. Modern Welding Practice, vol. II, Caxton Publishing Co., London TT 21103 1958, pp. 298, 299.

Primary Examiner—Deborah Yee
Attorney, Agent, or Firm—Armstrong, Nikaido, Marmelstein, Kubovcik & Murray

[57] ABSTRACT

A method of repairing or modifying a turbine blade wherein damage or erosion has occurred to the end part of a turbine blade or it is required to remove the end part so as to improve the efficiency of the blade as a whole comprises the steps of removing the damaged end part or a part requiring replacement, securing a new piece of material to the blade which may or may not be partly preformed, and after securing of the new piece of material to the blade and heat treatment processes, subsequently working the new piece of material so that it conforms to the desired shape. The working of the new piece of material only after securement and heat treatment ensures that discontinuities such as lacing wire holes, shroud band apertures, tenons etc., are not left with concentrations of inbuilt stress due to the welding or heat treatment operations and if required the new part may be oversize material which ensures that if slight misalignment occurs between the blade and the new piece of material there is sufficient materia to enable the part to be worked to the correct shape.

16 Claims, 3 Drawing Sheets

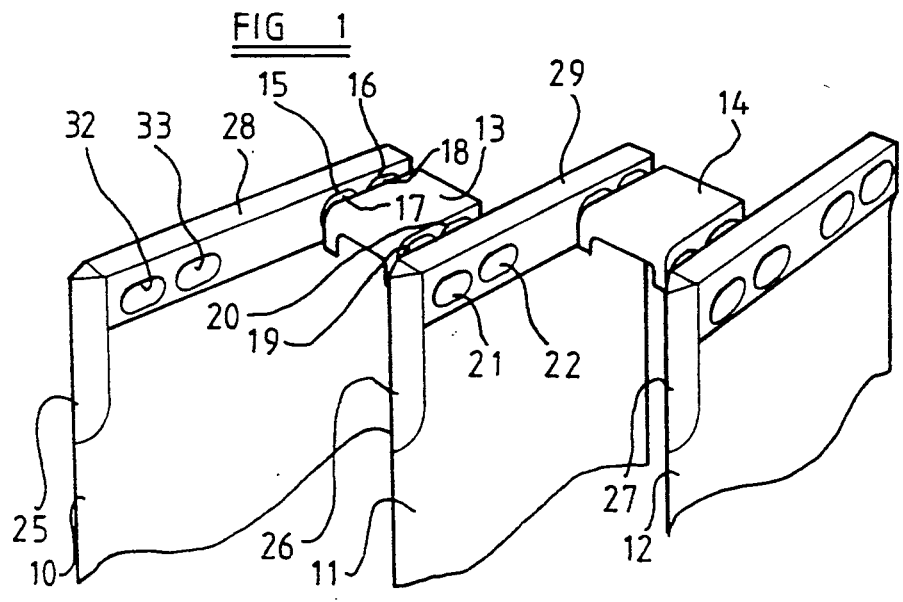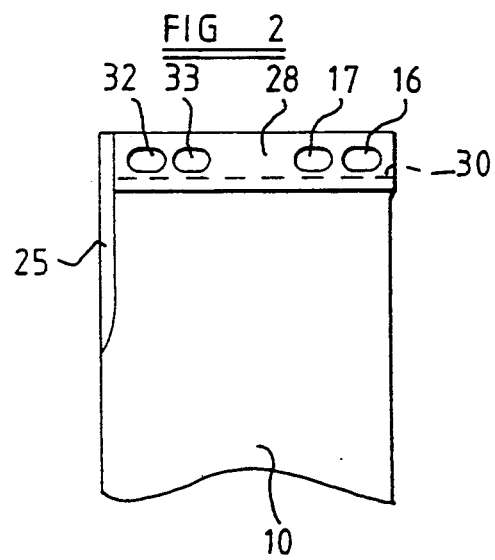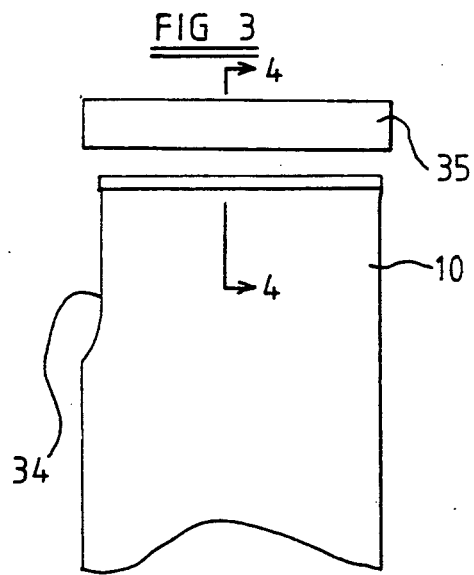

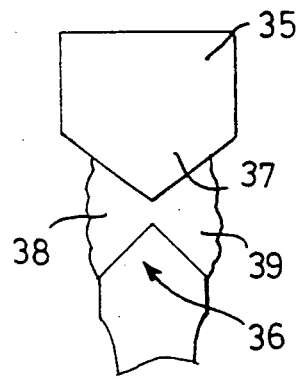
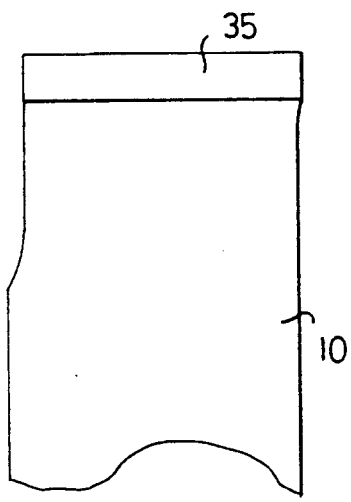
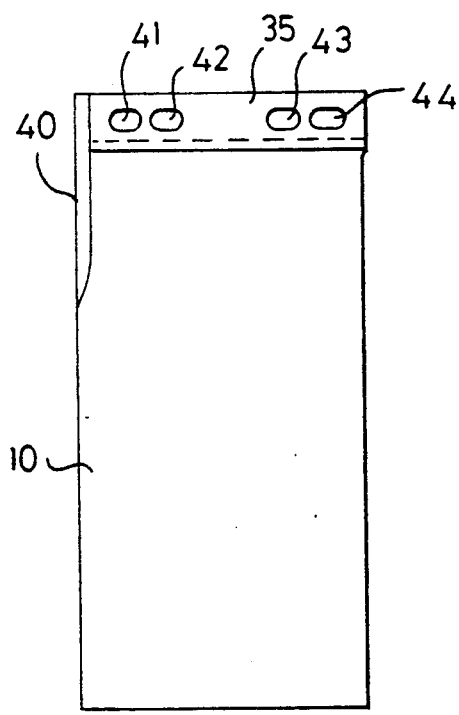

METHOD OF REPAIRING OR MODIFYING TURBINE BLADES

BACKGROUND TO THE INVENTION

1. Field of the Invention

The present invention relates to a method of repairing or modifying turbine blades of the type in which an array of turbine blades, arranged in a rotor for example, have their outer ends interconnected by cover bands, shrouds, pins or other interconnecting members.

Each blade in the array will be provided with some formation, for example an aperture or projection which cooperates with a part of the cover band, pin or shroud so as to locate the cover blade or other interconnecting member relative to the end of the blade or blades to which it is affixed.

In use of the turbine, some movement can occur between the cover bands and the ends of the blades which, in view of the high forces to which the blades are subjected, can lead to work hardening of the area of the blade in proximity to the cover band which in turn can lead to cracks and the effect known as stress corrosion cracking.

Such cracks are known in particular to occur around holes in the turbine blade tips into which projections from the cover band or other interconnecting members are secured, such cracks extending radially outwardly from the through bore or slot provided in the turbine blade.

Considerable problems have been experienced in trying to repair such cracks in view of the hardening that has taken place to the material. In some cases such is the degree of hardening that it is not possible to return the material, by heat treatment process for example, to an acceptable state.

In some cases such turbine blades may be provided with an erosion shield which requires repair, or may merely require repair to the leading edge which may have suffered erosion and the application of considerable heat as is necessary in a welding operation may itself cause damage to the end of the blade in view of the hardening that has taken place.

In practice therefore, a satisfactory repair was not possible and the whole blade had to be replaced.

It has been proposed in British patent specification No. 2091140B to solve the problem of preforming a turbine blade tenon with a root part, the root part is subsequently attached to the blade by a welding or brazing operation. The root part is preferably of elongate form and is of a shape so that it may key-in in a preformed slot in the blade itself so as to enable proper location of a tenon on the blade.

Whereas such a method of repair does overcome many of the problems of building up worn tenons by welding, the machining of the slot to receive the new tenon has to be very accurate which may considerably increase the time necessary to repair a turbine blade and involve the services of specialized persons and also utilize highly accurate machining equipment.

2. Prior Art

It has been proposed in British patent application 8818617.6 to preform an end blade portion including new tenons and to remove a piece of the original blade carrying the worn tenon and by very accurate locating means, hold the preformed part exactly in the correct position to enable securement of the new tenon and blade part to the original blade.

SUMMARY OF THE INVENTION

Providing the new tenon and blade part can be accurately located, utilizing the location means of the present invention, a satisfactory repair can be effected. However, it will be appreciated that the utmost care must be taken in locating the new tenon and blade part, otherwise the repaired blade will not be of the correct configuration.

In some cases, repair may not be necessary but it may be desired to replace the end part of the blade so as to enhance the performance and/or efficiency of the turbine.

It is an object of the present invention to provide a new or improved method of repairing or modifying a turbine blade.

According to one aspect of the present invention, we provide a method of repairing or modifying a turbine blade comprising the steps of:

(a) removing an end part of the blade;
(b) securing by welding a new piece of material to the end of the blade;
(c) heat treating said blade in the are of said weld;
(d) machining, polishing or otherwise working the new piece of material as necessary to the desired shape.

The present invention thus addresses the problem of the repair of tenons and other locating formations at the end of turbine blades in a completely different manner to that proposed in the prior art.

The prior art proposals are directed to the accurate location of an accurately machined tenon and root part, whereas the present invention provides for the attachment of a piece of material which may be preformed but which still has material to be subsequently machined so that absolute accuracy in location of the new part is not necessary.

In certain circumstances, the piece of material may comprise one or more different types of material and may be secured to the turbine blade in separate operations. The piece or pieces of material attached to the turbine blade may be material the same as or compatible with the material of the turbine blade or may be of a different material that provides properties that will enhance the working life of the blade, and in particular the material may be selected to have properties for combatting corrosion and/or wear and/or cracking that may tend to occur, particularly in the region of the outer end of the turbine blade.

Preferably, the new piece of material is selected to be of a size such that the zone, part of which will be on the new material and part on the remainder of the blade, affected by heat during welding is positioned on a part that is most beneficial when blade stresses are considered, i.e. part of the blade that will not be subjected to high stresses experienced by the blade during use.

In some cases, the new piece of material may be of a size such that any aperture provided therein or formation that is provided thereon or therein subsequent to securing the blade is removed from the aforesaid heat affected zone.

Preferably said new piece of material is of a size such that any aperture provided therein or formation that is provided thereon or therein subsequent to securing to the blade is removed from the zone subjected to the most heat during the welding operation.

Preferably said piece of material conforms approximately to the shape of the piece of material removed but is larger which enables, during subsequent machining, allowances to be made of any misalignment of the piece of material relative to the remainder of the blade.

If desired, the piece of material may be different in shape to the piece of material removed to permit of changes or modifications to the blade or to enable connection to blade interconnection members different from those which were originally provided.

Preferably, said piece of material is similar in composition to the material of the remainder of the blade but may have properties beneficial to the life span of the blade.

Said method of repair may also include other repair steps to the blade, for example the replacement of an erosion shield and in which case the end of the blade will first be removed and a new piece secured thereto followed by heat treatment and re-shaping of the new piece of material following which a new erosion shield may be secured to the blade. A further heat treatment process may be carried out to stress relieve any inbuilt stress caused by the welding or brazing of the new erosion shield to the blade.

Preferably, said new piece of material, after securing to the blade and after said heat treatment processes being carried out, is formed with an aperture into which a projection, a cover band or other blade interconnecting member extends so as to secure adjacent blades on a rotor.

The method of repair may not only be used for repairing damage to a turbine blade but can also be carried out to enhance the performance of a turbine by modifying the shape of the end of the blade or the cover bands which secure adjacent blades so as to improve the seal between the stator and rotor which cannot otherwise be achieved without modification to the stator which can involve considerable expense.

It is envisaged that in the case where the blades have any other discontinuity such as lacing wire holes in the region of the weld area, such discontinuities will be removed by filling, by weld material for example, so as to minimize the concentration of stress caused by the welding operation.

It is expected that some distortion of the blade will occur during welding and the blade may preferably be pre-distorted by heat or mechanical form and after stress relief, the blade will preferably be as near as possible to its desired shape, any misalignment which is likely to be most prevalent at the end region can be compensated by making the new part which has been welded to the blade of a large size than is necessary and the machining of the new part can thus accommodate any misalignment, thereby obviating the need to subject the new end part of the blade to any physical force and hence minimize the risk of inbuilt stress following the repair.

It is envisaged that the part removed from the blade will be the complete end part and, when the new end part is welded to the blade, it is envisaged that the end part of the blade will be substantially unrestrained during welding or subsequent heat treatment so as to minimize stress.

Furthermore, any weakness in the repair which would normally be expected to be concentrated in the weld area, is removed from the area of highest stress and hence the blade is less likely to fail in that area.

The removal of the weld area to a position radially inwardly from the end of the blade enables the weld area to be polished rather than machined, which is a less expensive operation than machining and one that can be carried out more quickly than a machining operation.

It is envisaged that the new part may be substantially identical to the part removed but will always be of a form to permit of some machining to correct any misalignment of the new part relative to the remainder of the blade. It may be that in some cases a substantial part of the new part to be secured to the blade can be virtually in a finished state but other parts, such as apertures to be formed in an end part, may be for example only a pilot hole or not be formed at all until after some or all of the welding and/or heat treatment has taken place. In the case where apertures are to be provided it is envisaged that no new aperture will be formed in the new material until all the welding and heat treatment has taken place.

As aforementioned, the method of repair may be carried out to blades to alter the blade itself to make a blade more efficient or to make a blade of different design so as to be compatible with blades in an array on a rotor for example, and in such case the new part may be substantially different in shape from the part which it replaces, even in this case however, the new part will be attached to the blade and be of a form so that subsequent machining is still necessary so that the machining operations that take place can accurately provide the required formation of the end part after the new part has been firmly secured to the blade.

Such repair and replacement methods lend themselves to methods of repair of turbine blades in situ whereby the blades may be left on a rotor and because ultimate accuracy is not required when welding the new part to the blade, highly satisfactory repairs can be carried out without having to remove the blade from the rotor.

The method of repair provides tenons or other apertures or the like, i.e. parts of the blade which will be subjected to high stresses during use of the blade which are made from "virgin" material, i.e. material that will not be subjected to residual stresses which could result in problems during use of the blade is such stresses were not eliminated.

The invention will now be described in more detail, by way of example only, with reference to the accompanying drawings wherein:

BRIEF DESCRIPTION OF THE DRAWINGS

FIG. 1 is a diagrammatic view of part of a turbine blade array in which the blades and cover bands are shown in spaced relationship;

FIG. 2 is a side elevation of the end of one blade;

FIG. 3 is a view of the blade shown in FIG. 2, the end part has been removed and a new piece placed in position;

FIG. 4 is a view along the lines 4—4 of FIG. 3;

FIG. 5 is another view of the blade shown in FIGS. 3 and 4;

FIG. 6 shows a repaired blade;

DESCRIPTION OF THE PREFERRED EMBODIMENTS

Figure 7:
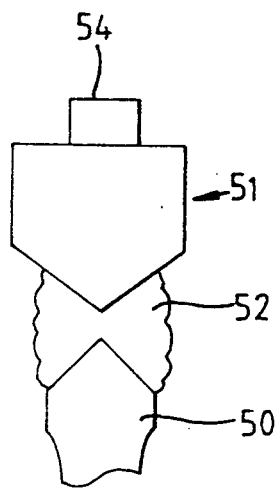
FIG. 7 is an end view of a turbine blade tip on which a new end part has been secured.

Referring first to FIG. 1, part of a turbine blade array is shown and comprises turbine blades generally indicated at 10, 11 and 12.

The blades 10 and 11 are interconnected by a cover band 13 and the blades 11 and 12 are connected by a cover band 14. The blades and cover bands are shown in spaced relationship so as to more clearly illustrate the shape of the blade and cover band.

The blade 10 is provided with two through bores 15 and 16 and the cover band 13 is provided with a pair of projections 17 and 18 which extend through the through bores 15 and 16 and may then be peened over to secure the cover band 13 to the blade 10. The projections 17 and 18 may be of tube-like configuration to facilitate the peening over of the edge regions so as to secure the cover band 13 to the blade 10.

The cover band 13 is also provided with a further pair of projections 19 and 20 which may be solid rod-like projections and Which extend into through bores 21 and 22 provided in blade 11 so as to allow for some relative movement between the parts.

The cover band 14 will be secured to the turbine blade 11 in a manner similar to the cover band 13 being secured to the blade 10. Thus each blade in the array has one cover band secured thereto and another cover band cooperating with but not being secured to the blade.

The turbine blades 10, 11 and 12 shown in FIG. 1 have respective erosion shields 25, 26 and 27 which may be made from a hard material such as Stellite so as to minimize the effects of erosion to the outer end of the leading edge of each blade.

After a period of use, it is often necessary for the erosion shields 25, 26 and 27 to be replaced and furthermore after a period of use, it is not uncommon for cracks to develop around the holes, e.g. 15 and 16, 21 and 22, due to hardening caused by working of the cover band 13 relative to the blade 10 to which it is affixed and relative to the blade 11 with which it co-operates.

The end part 28 of the blade 10 and the end part 29 of the blade 11 may be so hard, at least in the area surrounding the through bores therein, that the material is unworkable and even if cracks have not developed around the holes but, for example, it is required to replace the erosion shield, then welding in the region of the end parts 28 and 29 may leave the material of the blade at least in the end regions in an unacceptable state and lead to early failure of the blade.

In order to carry out a repair, a single blade will be described as shown in FIG. 2.

Once the cover band 13 has been removed and the cover band adjoining the blade 10 to the blade on its other side (not shown) repair work to the blade 10 can be commenced. Firstly, the erosion shield 25 may be removed and a part of the blade 10 machined to accept a new erosion shield and then the end of the blade is removed by cutting along the dashed line shown at 30, which line will be a small distance below the through bores 16 and 17 and the other through bores 32 and 33 which co-operate with projections on the cover bands.

Referring now in addition to FIG. 3, the blade 10 is shown, the erosion shield 25 having been removed and a portion 34 of the blade having been removed so as to accept a new insert of hard material, for example Stellite.

A new end part 35 is also shown in spaced relationship to the blade 10, the end part 35 being a little larger than the part 28 removed from the blade, the part 35 may, for example, comprise a piece of material of constant section or there may have been some approximate shaping of the piece. However, it is ensured that the size of the new piece 35 is such that if it is subsequently attached to the blade in misalignment there is sufficient surplus material to machine the end part 35 subsequent to securement to the blade 10 to the correct profile.

Referring now in addition to FIG. 4, the manner in which the new piece of material 35 is secured to the blade 10 can be shown. The outer end of the blade 10 is given a V-shaped profile as indicated generally at 36 and the lower edge of the insert 35 is also given a V-shaped profile 37 and the gap formed between the blade 10 and the new part 35 is filled with weld material from both sides as shown at 38 and 39.

The blade may be made from any suitable material and a material often used is 12% chrome steel such as AISI 410 material having the following composition:

| | |
|---|---|
| Carbon | .09–.13% |
| Manganese | .70% max |
| Phosphorus | .030% max |
| Sulphur | .030% max |
| Silicon | 0.50% max |
| Nickel | 0.60% max |
| Chromium | 11.50–13.00% |
| Molybdenum | 0.40–0.80% |
| Vanadium | .15–2.0% |

The new part may be made from AISI 410 material as mentioned above or any other suitable material which has the following composition:

| | |
|---|---|
| Carbon | 0.20–0.25% |
| Manganese | 1.00% max |
| Silicon | 1.00% max |
| Phosphorus | 0.04% max |
| Sulphur | 0.03% max |
| Chromium | 11.00/13.50% |
| Nickel | 0.50/1.00% |
| Molybdenum | 0.75/1.25% |
| Tungsten | 0.75/1.25% |
| Vanadium | 0.20/0.50% |

Once the new part 35 has been secured to the blade 10 is may be machined to the correct form and heat treated so as to achieve the formation shown schematically in FIG. 5.

When the new part 35 is welded to the blade 10 it is desirable that there should be little or no physical restraint of the part 35 relative to the blade 10 so as to minimize stresses that may occur during welding of the part 35 to the blade 10.

The minimization of inbuilt stress is of considerable advantage that enable more satisfactory stress relief on heat treatment but may give rise to some misalignment of the new part 35 relative to the blade 10 hence the reason for making the new part 35 of somewhat oversize to ensure there is sufficient material so that it may be machined to the correct form.

Once any heat treatment process has been carried out, a new erosion insert 40 may be secured to the blade 10, the insert may be made from Stellite secured to the blade by a relatively soft weld material such as Inconel and the area around the insert 40 may then also be subjected to stress relieving heat treatment processes.

When the blade 10 has been satisfactorily stress relieved, further machining may take place on the part 35 to make the new apertures 41, 42, 43 and 44 so that the blade may properly co-operate with the cover bands. It is envisaged that since the repair step may be made primarily to modify the blade, the end part 35 may be of a different configuration than the end part which is replaced and there may be different apertures or other formations formed in the end part to so-operate with cover bands, shrouds or the like.

Any apertures or discontinuities will only be formed in the blade or the new end part 35 when all stress relieving heat treatments have been completed so that there is no undue discontinuities in the blade which may cause a concentration of inbuilt stress.

Figure 8:
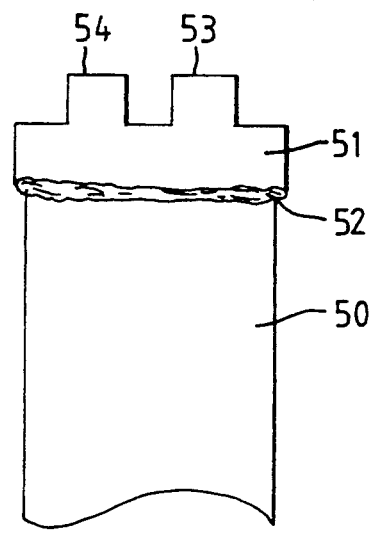
FIG. 8 is a side elevation of the blade shown in FIG. 7.
Figure 9:
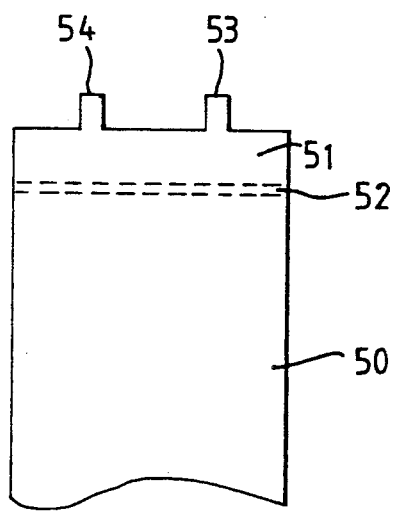
FIG. 9 is a side elevation of the blade shown in FIGS. 7 and 8 after machining of the end part.

Referring now to FIGS. 7, 8 and 9, part of the blade 50 is shown in which the end part has been removed. In this case the end part had a pair of tenons which would have co-operated in apertures formed in a cover band or shroud and is often the case with such blades, after a while movement occurs between the shroud and tenons which gives rise to cracking due to working of the tenons and eventually one or more may fail.

It has been the practice in the past to build up such tenons by building up layers of weld material. However, this results in a tenon formed from "cast material" which in use is susceptible to failure.

A new part generally indicated at 51 is welded to the blade 50 by weld material 52, it will be noted that the part 51 is, even though partly machined, oversized from the size of the end part actually required. The new part 51 has a pair of oversize tenons 53 and 54 so that when the new part 51 is secured to the blade 50, even though care will be taken to locate it in the proper position, it does not have to be forcefully restrained to such position during welding, which could lead to inbuilt stress.

If any slight distortion or misalignment occurs during welding, the oversizing of the new end part gives sufficient leeway to permit of subsequent machining or polishing of the part to form its proper size, as shown in FIG. 9.

It will be seen in FIG. 9 that the tenons 53 and 54 have been reduced in size as has the main part of the new part 51. The area of cast or weld material 52 is situated well away from the area of maximum stress in use, i.e. the tenons 53 and 54 and hence any weakness inherent in the weld area 52 because of the heat input and the nature of the material is at a position which should not be subjected to undue stress in use of the blade and hence any inherent weakness in that area is of little consequence.

The blade illustrated has been shown as having two tenons. However, it will be appreciated that a single tenon may be provided or indeed any number of tenons, or there may be combination of tenons, apertures or other formations provided on the new part to co-operate with shrouding, cover bands, lacing wires etc., so that the blade being repaired may be properly tied to adjacent blades.

It has been mentioned above that a new end part may be made from a material different from the remainder of the blade and the material of the end part may be chosen so that it will have enhanced properties which will hopefully provide a longer life span than the material from which the remainder of the blade is made. The end part may for example be made from material known as Jet Heat having the following composition and where an erosion shield is to be affixed, this may be made from Stellite, or a hardened tool steel or any other suitable material that will provide a barrier to erosion of the end part of the blade.

|  | Min | Max |
| --- | --- | --- |
| Carbon | 0.08 | 0.15 |
| Manganese | 0.50 | 0.90 |
| Silicon | — | 0.35 |
| Phosphorus | — | 0.025 |
| Sulphur | — | 0.025 |
| Chromium | 11.00 | 12.50 |
| Nickel | 2.00 | 3.00 |
| Molybdenum | 1.50 | 2.00 |
| Vanadium | 0.25 | 0.40 |
| Nitrogen | 0.01 | 0.05 |
| Copper | — | 0.50 |

The position at which the end of the blade is cut to remove the end part so that a new part can be affixed is important to ensure that where apertures subsequently formed in the new end part, the apertures can be formed in a part of the blade that has not been subjected to excessive heat during a welding process and there is therefore preferably a space between the edge of an aperture or other formation to be formed therein and the area which is subjected to maximum heat during a welding process.

Only two examples of a blade have been shown in the accompanying drawings. However, it will be appreciated that the repair step is applicable to many different designs of blade and can be carried out as a repair step or alternatively can be carried out as a method of modifying an existing blade so as to improve its performance in use.

The features disclosed in the foregoing description, or the following claims, or the accompanying drawings, expressed in their specific forms or in the terms or means for performing the desired function, or a method or process for attaining the disclosed result, may, separately or in any combination of such features, be utilized for realizing the invention in diverse forms thereof.

We claim:

1. A method of repairing or modifying a turbine blade comprising the steps of:
   (a) removing an end part of the blade;
   (b) securing by welding a new piece of material to the end of the blade;
   (c) heat treating said blade in the area of said weld;
   (d) machining, polishing or otherwise working the new piece of material as necessary to the desired shape.

2. A method of repairing or modifying a turbine blade according to claim wherein the blade is of the type having at least one aperture and wherein said method comprises the additional steps of reforming said aperture in said new piece of material after carrying out the heat treatment of the blade.

3. A method of repairing or modifying a turbine blade according to claim wherein the blade is of the type having one or more tenons formed therein and wherein the final shaping of the tenon is carried out after welding of the new piece of material to the blade.

4. A method of repairing or modifying a turbine blade according to claim 1 wherein the new piece of material is selected to be of a size such that the zone affected by heat during welding of the new piece of material to the remainder of the turbine blade is positioned on a part of the blade that will not be subjected to high stresses experienced by the blade during use thereof.

5. A method of repairing or modifying a turbine blade according to claim 1 wherein said new piece of material is of a size such that any aperture provided therein is removed from the zone subjected to the most heat during the welding operation.

6. A method of repairing a turbine blade according to claim wherein said new piece of material conforms approximately to the shape of the piece of material removed but is larger enabling, during subsequent working, allowance to be made of any misalignment of the piece of material relative to the remainder of the blade.

7. A method of modifying a turbine blade according to claim 1 wherein said new piece of material is shaped at least in part prior to securing to the remainder of the blade and wherein further operations are carried out to shape the new piece of material to its final shape after securing to the remainder of the blade.

8. A method of repairing or modifying a turbine blade according to claim 1 wherein the new piece of material is similar in composition to the material of the remainder of the blade.

9. A method of repairing or modifying a turbine blade according to claim 1 wherein said new piece of material is different in composition to the material of the remainder of the blade, the composition of said new piece of material being selected to enhance the reliability and/or life span of that part of the blade.

10. A method of repairing or modifying a turbine blade according to claim 1 wherein any discontinuity is not removed with the piece of material removed from the turbine blade, is eliminated by filling with weld material prior to any heat treatment processes being carried out.

11. A method of repairing or modifying a turbine blade according to claim 1 wherein the blade being repaired is substantially unrestrained during said welding and during said heat treatment processes.

12. A method of repairing or modifying a turbine blade according to claim 1 wherein said new piece of material comprises AISI 410 material as defined in the accompanying specification.

13. A method of repairing or modifying a turbine blade according to claim 1 wherein said new piece of material comprises AISI 422 material as defined in the accompanying specification.

14. A method of repairing or modifying a turbine blade according to claim 1 wherein said new piece of material comprises material known as Jet Heat and defined in the accompanying specification.

15. A method of repairing or modifying a turbine blade according to claim 1 wherein said method of repair includes the steps of removing a shield from the leading edge of the blade and securing a new shield to the blade, said new shield being made from a material harder than the blade material.

16. A method of repairing or modifying a turbine blade according to claim 1 wherein the new piece of material is treated after securing to the remainder of the blade to enhance the properties or durability of that part of the blade.

* * * * *